United States Patent
Nair et al.

(10) Patent No.: US 9,647,894 B2
(45) Date of Patent: May 9, 2017

(54) MAPPING RELATIONSHIPS AMONG VIRTUAL ELEMENTS ACROSS A SYSTEM

(71) Applicant: International Business Machines Corporation, Armonk, NY (US)

(72) Inventors: Ranjith R. Nair, Bangalore (IN); Sanket S. Sangwikar, Kalyan (IN); Amit S. Wankhede, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 121 days.

(21) Appl. No.: 14/446,371

(22) Filed: Jul. 30, 2014

(65) Prior Publication Data
US 2016/0034317 A1    Feb. 4, 2016

(51) Int. Cl.
| H04L 12/24 | (2006.01) |
| H04L 12/46 | (2006.01) |
| H04L 12/931 | (2013.01) |
| H04L 12/937 | (2013.01) |

(52) U.S. Cl.
CPC .......... *H04L 41/12* (2013.01); *H04L 12/4641* (2013.01); *H04L 41/0853* (2013.01); *H04L 41/0893* (2013.01); *H04L 49/253* (2013.01); *H04L 49/35* (2013.01); *Y02B 60/43* (2013.01)

(58) Field of Classification Search
CPC ....... H04L 49/35; H04L 49/351; H04L 49/70; H04L 41/0893; H04L 41/12; H04L 49/253; H04L 41/0803; G06F 12/023; G06F 9/5077
See application file for complete search history.

(56) References Cited

U.S. PATENT DOCUMENTS

| 7,649,851 B2* | 1/2010 | Takashige ........... H04L 41/0803 370/254 |
| 8,775,590 B2* | 7/2014 | Devarakonda ...... H04L 43/0817 709/223 |
| 9,154,445 B2* | 10/2015 | Tripathi .................. H04L 49/35 |
| 9,160,668 B2* | 10/2015 | Tripathi ................ H04L 49/253 |
| 2005/0120160 A1 | 6/2005 | Plouffe et al. |
| 2012/0042095 A1* | 2/2012 | Kotha ..................... H04L 12/56 709/233 |
| 2012/0131157 A1* | 5/2012 | Gospodarek .......... H04L 61/103 709/222 |

(Continued)

OTHER PUBLICATIONS

List of IBM Patents or Patent Applications Treated as Related.
U.S. Appl. No. 14/733,004; Mapping Relationships Among Virtual Elements Across a System; filed Jun. 8, 2015.

*Primary Examiner* — Ramy M Osman
(74) *Attorney, Agent, or Firm* — James L. Baudino

(57) ABSTRACT

A system for mapping relationships among virtual elements across a system includes a switch and a server having a virtualized network interface controller (vNIC) with a plurality of vNIC links connected to the switch. The system also includes a virtual relationship module configured to: identify relationships between physical ports on the switch and virtual ports on the switch; for each vNIC link, identify local area network (LAN) interface information on the server; create data structures establishing topology information between the switch and the server; and create a mapping of each vNIC link to a respective virtual port on the switch by correlating the topology information with the LAN interface information.

6 Claims, 7 Drawing Sheets

(56) References Cited

U.S. PATENT DOCUMENTS

| | | | |
|---|---|---|---|
| 2013/0215754 A1* | 8/2013 | Tripathi | H04L 49/253 370/236 |
| 2013/0242983 A1* | 9/2013 | Tripathi | H04L 49/35 370/355 |
| 2013/0279909 A1 | 10/2013 | Srinivas et al. | |
| 2014/0003442 A1* | 1/2014 | Hernandez | H04L 49/35 370/401 |
| 2014/0006573 A1* | 1/2014 | Goto | H04L 63/164 709/221 |
| 2015/0188770 A1* | 7/2015 | Naiksatam | H04L 41/0893 370/254 |
| 2015/0370586 A1* | 12/2015 | Cooper | G06F 12/023 710/308 |

* cited by examiner

MAPPING RELATIONSHIPS AMONG VIRTUAL ELEMENTS ACROSS A SYSTEM

BACKGROUND

Server virtualization describes a software abstraction that separates a physical resource and its use from the underlying physical machine. Most physical resources can be abstracted and provisioned as virtualized entities. Some examples of virtualized entities include the central processing unit (CPU), network input/output (I/O), and storage I/O. A virtual machine (VM) is a virtualization of a physical machine and its hardware components. A VM typically includes a virtual processor, virtual system memory, virtual storage, and various virtual devices. A single physical machine can host a plurality of VMs. Guest operating systems execute on the VMs and function as though executing on the actual hardware of the physical machine.

A layer of software provides an interface between the VMs resident on a physical machine and the underlying physical hardware (commonly referred to as a hypervisor or virtual machine monitor (VMM)). This interface multiplexes access to the hardware among the VMs. Typical server virtualization implementations have the VMs share the physical network interface (e.g., a network adapter, network interface card, or NIC) of the physical machine for performing external network I/O operations. In some systems, the NIC may also be virtualized. For example, an Unified Fabric Port (UFP) protocol may be used to flexibly allocate, reallocate and/or adjust bandwidth for a communication link. The UFP protocol logically partitions the physical communication link that connects the port of a physical network interface on a server (e.g., the NIC) to the port of a network switch into logical subdivisions or channels (each a vNIC). To the operating system on the server (or to the hypervisor), each channel appears as an independent physical network interface having its own unique media access control (MAC) address. Each channel is independently managed as a separate switch port (i.e., virtual port) on the network switch. The number of channels and the bandwidth of each channel are configurable from the network switch or through an application programming interface (API) to the physical network interface.

BRIEF SUMMARY

According to one aspect of the present disclosure a system and technique for mapping relationships among virtual elements across a system is disclosed. The system includes: a switch and a server having a virtualized network interface controller (vNIC) with a plurality of vNIC links connected to the switch. The system also includes a virtual relationship module configured to: identify relationships between physical ports on the switch and virtual ports on the switch; for each vNIC link, identify local area network (LAN) interface information on the server; create data structures establishing topology information between the switch and the server; and create a mapping of each vNIC link to a respective virtual port on the switch by correlating the topology information with the LAN interface information.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Figure 1:
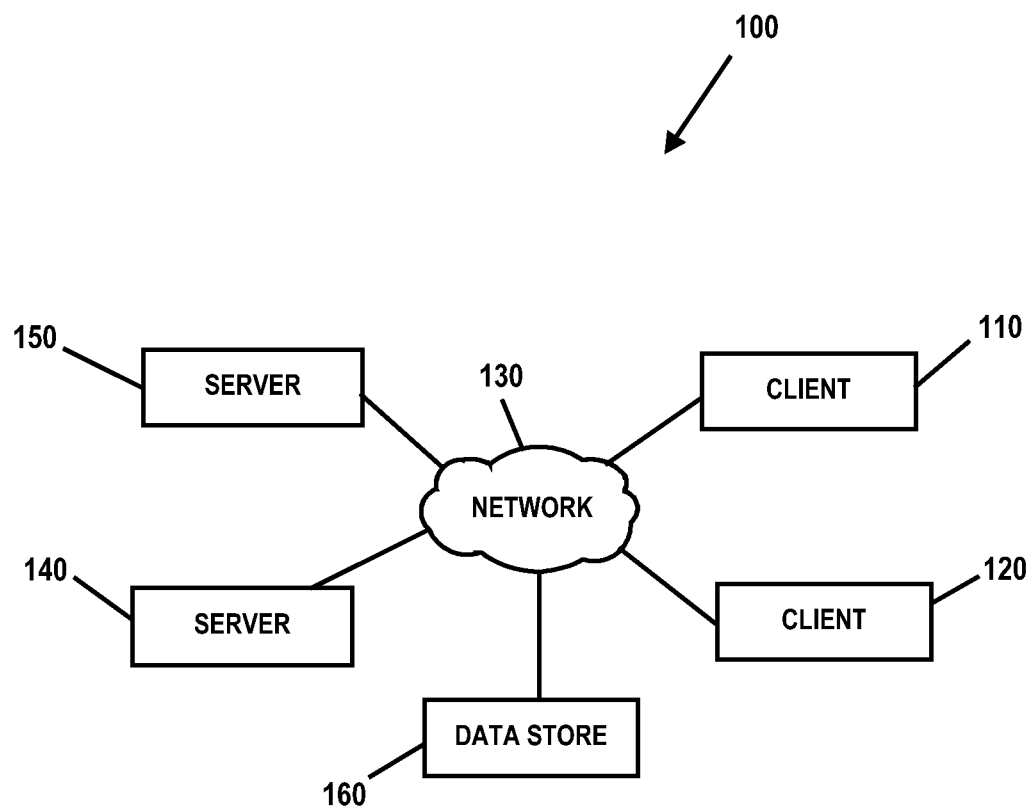
FIG. 1 is an embodiment of a network of data processing systems in which the illustrative embodiments of the present disclosure may be implemented.

Embodiments of the present disclosure provide a method, system and computer program product for mapping relationships among virtual elements across a system. Embodiments of the present disclosure are configured to create a mapping or network topology between virtual network interface card (vNIC) ports on a server to virtual ports on a switch. Thus, for example, in some embodiments, the method and technique includes: for a server having a virtualized network interface controller (vNIC) with a plurality of vNIC links connected to a switch, identifying relationships between physical ports on the switch and virtual ports on the switch; for each vNIC link, identifying local area network (LAN) interface information on the server; creating data structures establishing topology information between the switch and the server; and creating a mapping of each vNIC link to a respective virtual port on the switch by correlating the topology information with the LAN interface information.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
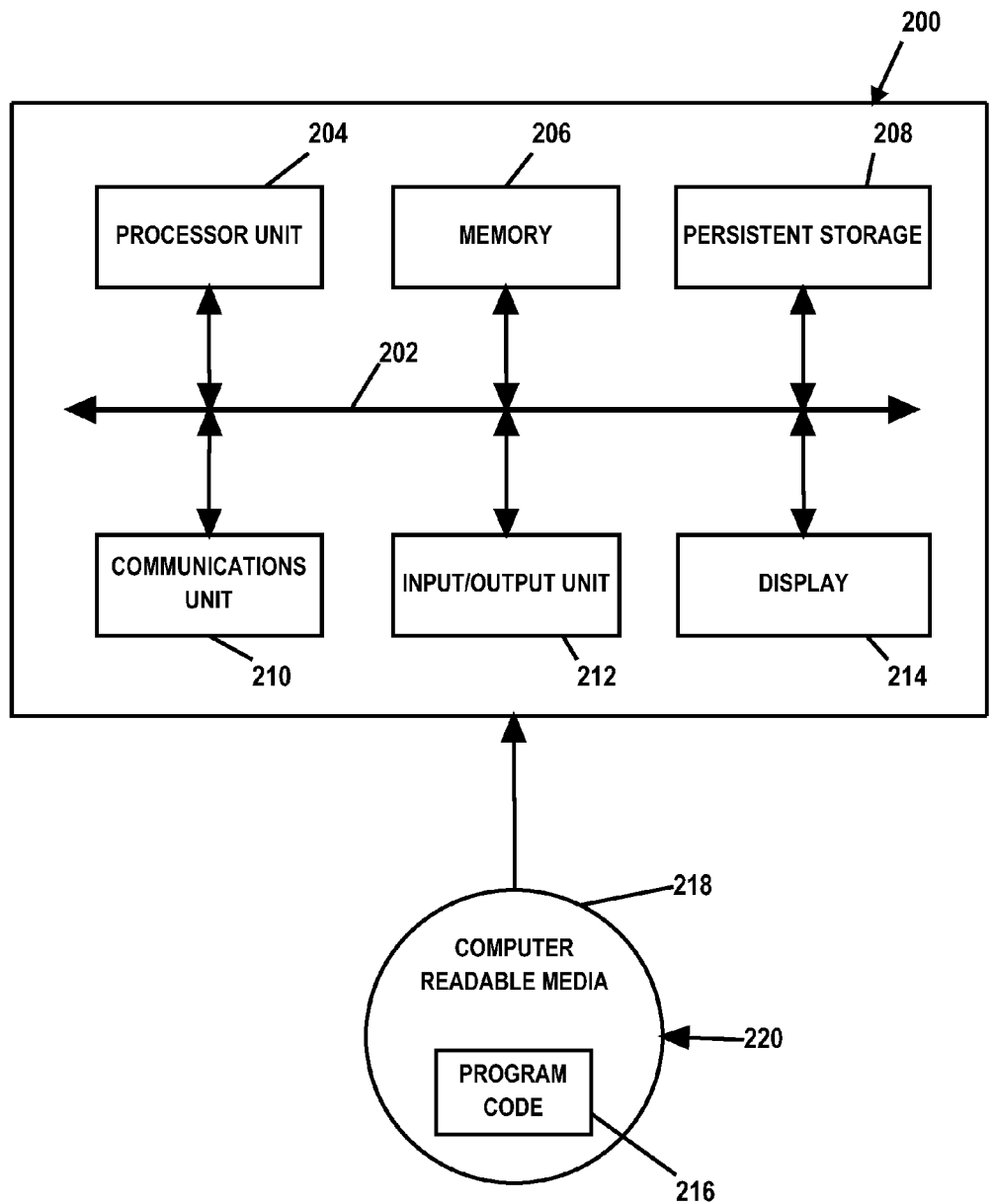
FIG. 2 is an embodiment of a data processing system in which the illustrative embodiments of the present disclosure may be implemented.

With reference now to the Figures and in particular with reference to FIGS. 1-2, exemplary diagrams of data processing environments are provided in which illustrative embodiments of the present disclosure may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is a pictorial representation of a network of data processing systems in which illustrative embodiments of the present disclosure may be implemented. Network data processing system 100 is a network of computers in which the illustrative embodiments of the present disclosure may be implemented. Network data processing system 100 contains network 130, which is the medium used to provide communications links between various devices and computers connected together within network data processing system 100. Network 130 may include connections, such as wire, wireless communication links, or fiber optic cables.

In some embodiments, server 140 and server 150 connect to network 130 along with data store 160. Server 140 and server 150 may be, for example, IBM® Power Systems™ servers. In addition, clients 110 and 120 connect to network 130. Clients 110 and 120 may be, for example, personal computers or network computers. In the depicted example, server 140 provides data and/or services such as, but not limited to, data files, operating system images, and applications to clients 110 and 120. Network data processing system 100 may include additional servers, clients, and other devices.

In the depicted example, network data processing system 100 is the Internet with network 130 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

FIG. 2 is an embodiment of a data processing system 200 such as, but not limited to, client 110 and/or server 140 in which an embodiment of a system for mapping relationships among virtual elements across a system according to the present disclosure may be implemented. In this embodiment, data processing system 200 includes a bus or communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

In some embodiments, memory 206 may be a random access memory or any other suitable volatile or non-volatile storage device. Persistent storage 208 may take various forms depending on the particular implementation. For example, persistent storage 208 may contain one or more components or devices. Persistent storage 208 may be a hard drive, a flash memory, a rewritable optical disk, a rewritable magnetic tape, or some combination of the above. The media used by persistent storage 208 also may be removable such as, but not limited to, a removable hard drive.

Communications unit 210 provides for communications with other data processing systems or devices. In these examples, communications unit 210 is a network interface card. Modems, cable modem and Ethernet cards are just a few of the currently available types of network interface adapters. Communications unit 210 may provide communications through the use of either or both physical and wireless communications links.

Input/output unit 212 enables input and output of data with other devices that may be connected to data processing system 200. In some embodiments, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. For example, a storage device in data processing system 200 is any hardware apparatus that may store data. Memory 206, persistent storage 208, and computer readable media 218 are examples of storage devices in a tangible form.

Figure 3:
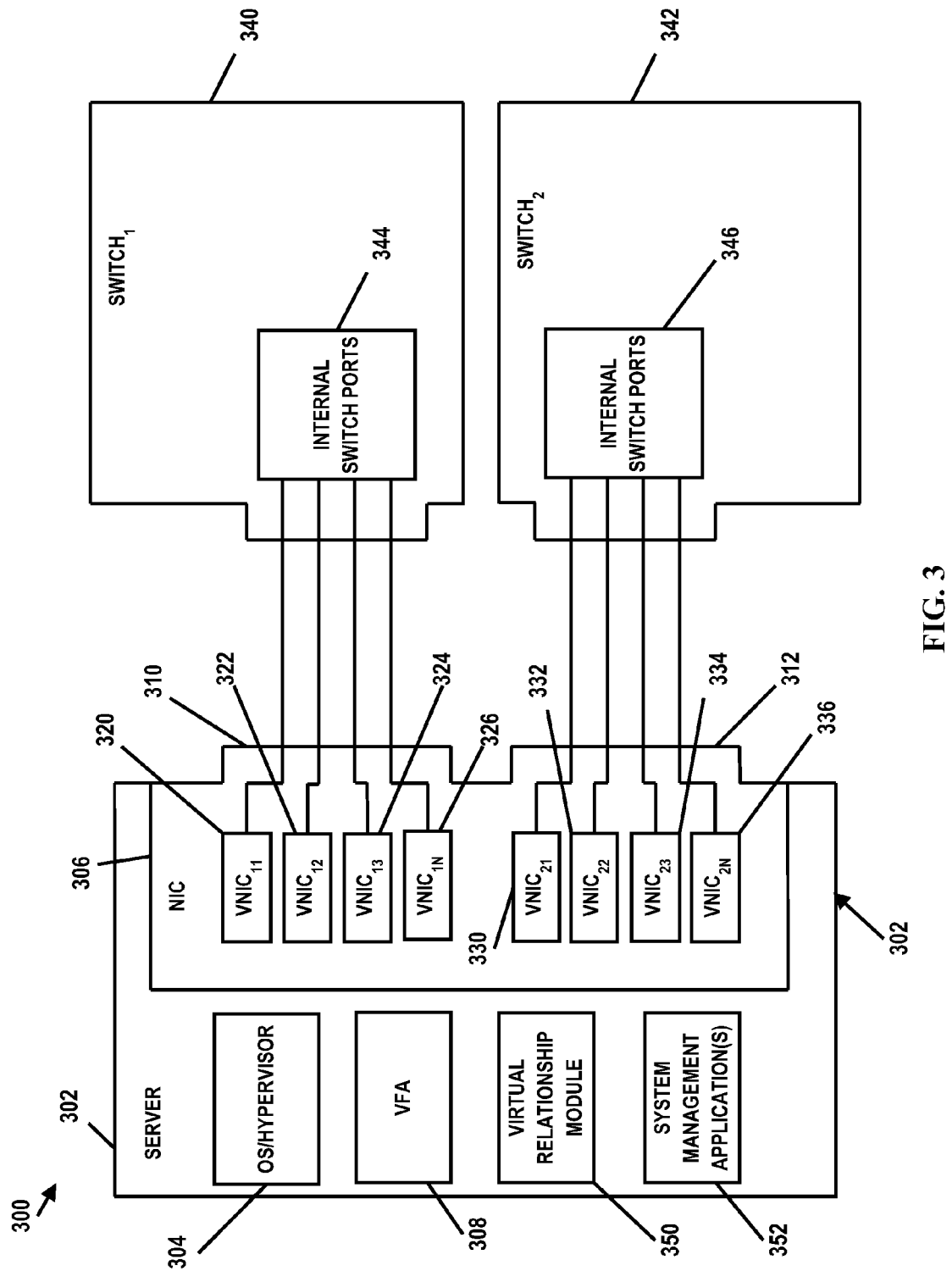
FIG. 3 is a diagram illustrating an embodiment of a computing environment in which illustrative embodiments of a system for mapping relationships among virtual elements according to the present disclosure may be implemented.

FIG. 3 is an illustrative embodiment of a system 300 for mapping relationships among virtual elements across a computing environment. Various components of system 300 may be implemented on data processing systems or platforms such as, but not limited to, servers 140 and/or 150, clients 110 and/or 120, or at other data processing system locations. In FIG. 3, system 300 illustrates a server 302 having an operating system (OS) and/or hypervisor 304, a network interface card (NIC) 306 and a virtual fabric adapter (VFA) 308. In the illustrated embodiment, NIC 306 includes two physical NIC ports ($pNIC_1$ 310 and $pNIC_2$ 312). VFA 308 is configured to virtualize the physical interfaces of NIC 306 (e.g., $pNIC_1$ 310 and $pNIC_2$ 312) by partitioning the physical interface into a number logical subdivisions or channels (each a vNIC), each of which can be presented to the OS as a separate physical interface. For example, $pNIC_1$ 310 has been logically divided into $vNIC_{11}$ 320, $vNIC_{12}$ 322, $vNIC_{13}$ 324 through $vNIC_{1n}$ 326. Similarly, $pNIC_2$ 312 has been logically divided into $vNIC_{21}$ 330, $vNIC_{22}$ 332, $vNIC_{23}$ 334 through $vNIC_{2n}$ 336. The number of physical interfaces and/or vNICs may vary. VFA 308 may be implemented in any suitable manner using known techniques that may be hardware-based, software-based, or some combination of both. For example, VFA 308 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system).

In FIG. 3, the two physical interfaces of NIC 306 ($pNIC_1$ 310 and $pNIC_2$ 312) connect to respective switches ($switch_1$ 340 and $switch_2$ 342). For example, the multiple virtual pipes created by virtualizing $pNIC_1$ 310 and $pNIC_2$ 312 connect to respective internal switch ports 344 and 346 of switches 340 and 342.

NIC 306 can function according to the following modes: 1) pNIC mode (or vNIC mode is off); 2) Virtual Fabric Mode (or vNIC 1 mode); 3) Switch Independent Mode (or vNIC 2 mode); and 4) Unified Fabric Port (or vNIC 3 mode). In pNIC mode, the adapter 306 operates as a standard adapter (e.g., such as a dual-port 10 Gbps Ethernet adapter), and it functions with any 10 GbE switch. In pNIC mode, NIC 306 operates in a traditional Converged Network Adapter (CNA) mode with two Ethernet ports and two storage ports (e.g., iSCSI or FCoE) available to the operating system.

In the Virtual Fabric Mode (vNIC 1 mode), NIC 306 communicates with the switch to obtain vNIC parameters. For example, a special tag may be added within each data packet and is later removed by the NIC 306 and/or switch 340/342 for each vNIC group to maintain separation of the virtual data paths. In vNIC 1 mode, each physical port is divided into a number of virtual ports per adapter. The bandwidth allocations between the different virtual data paths may be changed through a switch user interface without requiring a reboot of server 302.

In Switch Independent Mode (vNIC 2 mode), adapter 306 works with switch 340/342 and provides the same capabilities as Virtual Fabric Mode in terms of the number of vNICs and the bandwidth that each can be configured to have. Switch Independent Mode extends the existing virtual local area networks (VLANs) (e.g., connected to switches 340/342) to the vNIC interfaces. In vNIC 2 mode, when storage protocols are enabled on VFA 308, the different vNICs may correspond to different protocols (e.g., some number of vNICs are Ethernet, and another number of vNICs are iSCSI or FCoE.

Unified Fabric Port (UFP) (vNIC 3 mode) is most closely related to vNIC Virtual Fabric Mode in that in both sides, the switch and the NIC/CNA share in controlling bandwidth usage, but there are significant differences. Compared to vNIC, Unified Fabric Port supports the following modes of operation per vNIC (vPort):

Access: The vPort only allows the default VLAN, which is similar to a physical port in access mode.
Trunk: The vPort permits host side tagging and supports a number of defined VLANs on each vPort.
Tunnel: Q-in-Q mode, where the vPort is VLAN-independent.
FCoE: Dedicates the specific vPort for FCoE traffic.

VFA 308 and switches 340/342 can be configured in different modes which makes it difficult to determine the network topology between server 302 and switches 340/342. For example, there is no direct way to determine the topology information from the data collected via Simple Network Management Protocol (SNMP) on the switches 340/342, and via Common Information Model (CIM) on server 302. Embodiments of the present disclosure enable the identification of how the vNICs are connected to the virtual ports on the switch. The switch provides information about the connecting server port only for the physical port of the switch in the Link Layer Discovery Protocol (LLDP) remote device information. It has no information whether vNIC technology is being used. Additionally the link is discovered between a physical port of the switch and one of the virtual ports of the server, but this may be an incorrect relationship. Also the common SNMP inventory of the ports may not have the information of the virtual ports either. The server inventory however has the information of the vNICs each with distinct media access control (MAC) addresses obtained from the driver of VFA 308.

Embodiments of the present disclosure use the combination of LLDP information (which is only partially available and not specific to vNICs) and an algorithm to correlate this information with server side vNICs to extract the network topology for virtual ports. SNMP or forwarding database (FDB) information may also be used instead of LLDP to serve as a foundation input to the algorithm. In FIG. 3, a virtual relationship module 350 is illustrated. Module 350 obtains and/or otherwise uses the LLDP information to correlate the LLDP information with server side vNICs to extract a network topology for virtual ports of the system. Module 350 may be implemented in any suitable manner using known techniques that may be hardware-based, software-based, or some combination of both. For example, module 350 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system). In FIG. 3, module 350 is illustrated as residing on server 302; however, it should be understood that module 350 may be otherwise located.

Module 350 refers to various devices in the network like switches, servers, operating systems, as systems or manageable endpoints. These systems can, but not necessarily have, network interfaces like LAN, IP, VLAN and ports interfaces. They are also called as endpoints (e.g., a LAN endpoint). For example:

LAN interface/LANEndpoint—represents network adapter ports and is hosted by a system. A LAN interface of a system can define connectivity to other LAN interfaces of some other system. Module 350 connects LAN interfaces of server 302 to the LAN interface of switch 340/342. LAN interfaces are usually uniquely identified using MAC address values.
VLAN interface—VLAN interface represents capability for a port or a system to be a member of a Network VLAN. VLAN interface has 1:1 relationship with LAN interface or switch ports.
Switch Port—represents a port of a switch. Every switch port is typically bound to a LAN and VLAN interface that defines its connectivity to other devices
Ethernet Port—represents a network port on the server/hypervisor—physical (in case of vNIC is off)/virtual (in case of vNIC is on) on the server 302.
Physical NIC—The physical port on the NIC 306 on the server 302 is called a Physical NIC. This represents a distinct Ethernet port that connects to a physical port on the network switch.

Figure 4:
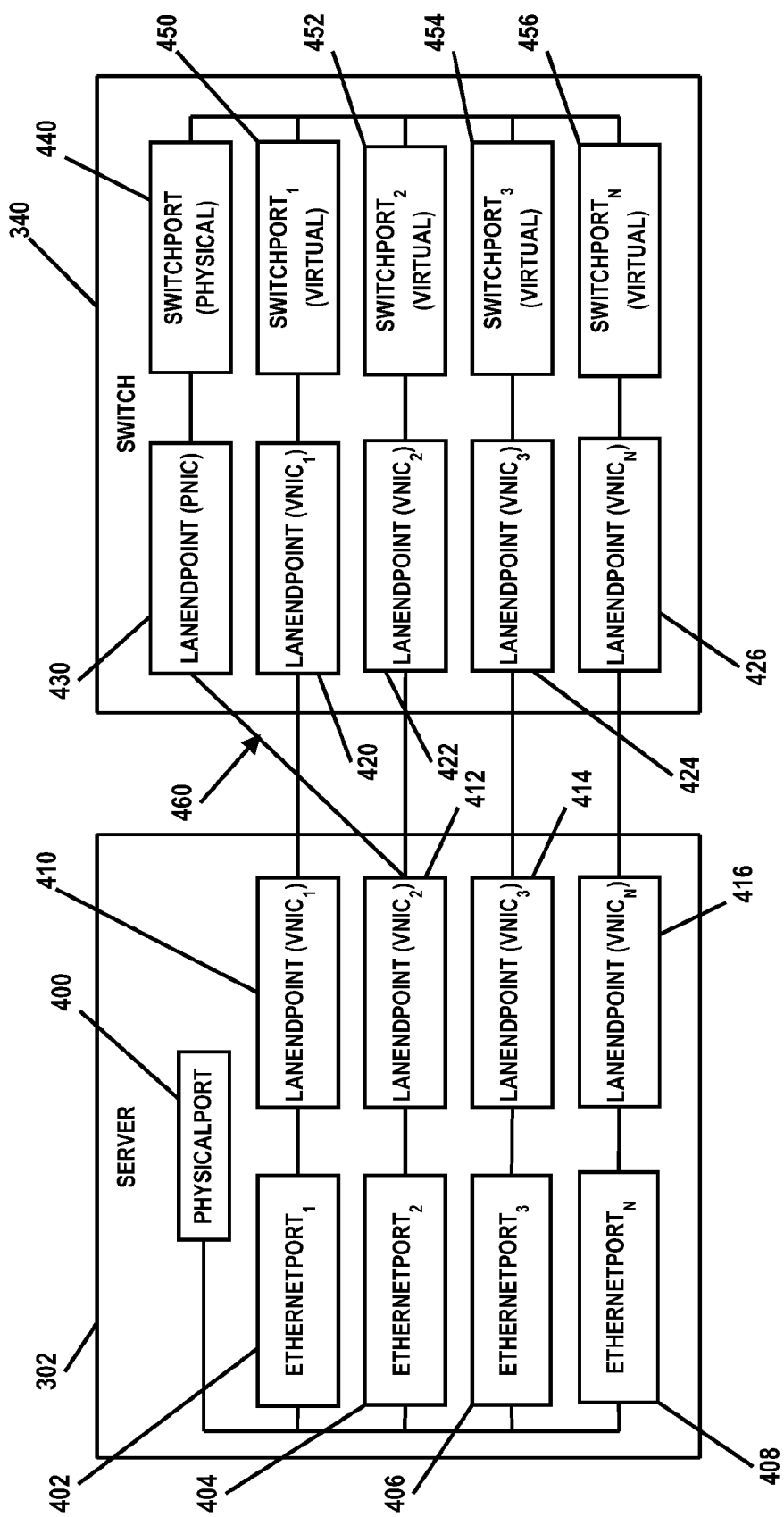
FIG. 4 is a diagram illustrating a mapping of virtual elements between a server and a switch according to the present disclosure.

FIG. 4 is a diagram illustrating how module 350 establishes relationships or topology links in different vNIC modes according to the present disclosure. In FIG. 4, the topology links created in vNic 1 mode and vNic 3 (UFP)

mode are depicted. FIG. 4 depicts server 302 and switch 340. Server 302 includes a physical port 400, Ethernetports$_{1-n}$ 402, 404, 406 and 408, and LANEndpoints (vNIC$_{1-n}$) 410, 412, 414 and 416. Switch 340 includes LANEndpoints (vNIC$_{1-n}$) 420, 422, 424 and 426, a physical LANEndpoint (pNIC) 430, a physical switchport 440, and virtual switchports$_{1-n}$ 450, 452, 454 and 456. The line/link 460 extending between LANEndpoint (vNIC$_2$) 412 and the physical LANEndpoint (pNIC) 430 represents an Ethernet link discovered using LLDP communication (e.g., confirming that switch 340 has a connection to server 302), which is only partial data and does not correlate with matching MAC addresses. The remaining lines/links in FIG. 4 depict the actual and complete topology representation after using module 350 according to the present disclosure.

Figure 5:
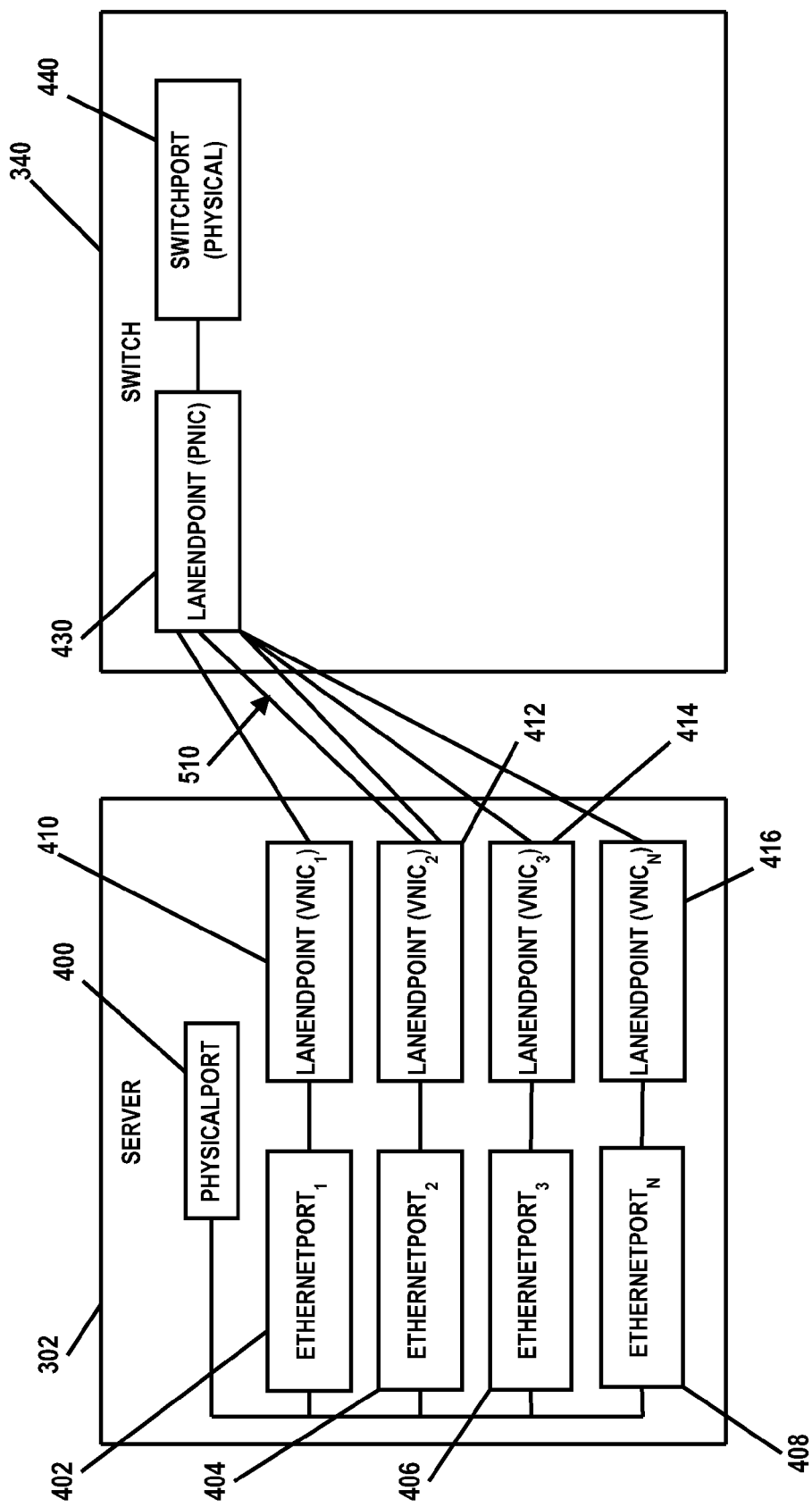
FIG. 5 is a diagram illustrating another mapping of virtual elements between a server and a switch according to the present disclosure.

FIG. 5 is a diagram illustrating how module 350 establishes relationships or topology links in the case of vNIC mode 2. In FIG. 5 depicts server 302 and switch 340. Server 302 includes physical port 400, Ethernetports$_{1-n}$ 402, 404, 406 and 408, and LANEndpoints (vNIC$_{1-n}$) 410, 412, 414 and 416. Switch 340 includes physical LANEndpoint (pNIC) 430 and physical switchport 440. The line/link 510 extending between LANEndpoint (vNIC$_2$) 412 and the physical LANEndpoint (pNIC) 430 represents an Ethernet link discovered using LLDP communication (e.g., confirming that switch 340 has a connection to server 302), which is only partial data and does not correlate with matching MAC addresses. The remaining lines/links in FIG. 5 depict the actual and complete topology representation after using module 350 according to the present disclosure.

Module 350 performs the following functions/operations: 1) establishes relations between physical ports and virtual ports on the switch; 2) establishes the specific LAN interface information on the server/hypervisor; 3) creates data structures to establish customized topology links between the switch and the server using available LLDP information; and 4) creates new topology links by correlating the information on the switch with the server.

Module 350 establishes relations between the physical ports and the virtual ports on the switch by gathering/using information of the switch ports, LAN interfaces and VLAN interfaces, which is generally accessed through Simple Network Management Protocol (SNMP) Management Information Bases (MIBs) and displayed in system management application(s) 352. However, ports corresponding to the vNIC technology are not the physical ports (even though they behave like one). The ports corresponding to the vNIC technology are accessed from different SNMP MIBs and are represented as virtual ports related to the parent physical port. The following exemplary pseudocode describes a process for establishing relations between the physical ports and the virtual ports on the switch:

```
Get all the vNIC entries by accessing SNMP MIBs for vNIC
For every vNIC entry {
    Get the physical port associated with the vNIC
    For each port up in each vNIC {
        Create a virtual port representing vNIC
        Set other information like bandwidth and vNIC operating mode, etc.
        Create the LAN and VLAN interfaces corresponding to the virtual
        port
        Create relationships between physical port of the switch and the
        virtual port
    }
}
```

Module 350 establishes the specific LAN interface information on the server. The server inventory will generally only show the physical NICs. However, for only the first vNIC matched will that MAC address which is missing in the LLDP information be obtained from the switch. Thus, for a vNIC-based environment, the system management application(s) has to create the virtual NIC LANEndpoints. This is resolved in the module 350 by using an adapter-specific API to retrieve the LAN interface details for the vNICs and representing them in the systems management application for the server. The following exemplary pseudocode describes a process for establishing establishes the specific LAN interface information on the server:

```
Get all the vNIC entries from adapter driver
For every entry {
    For each port in each vNIC entry {
        Create a LANEndpoint with the unique MAC address of the vNIC
        Create Ethernet Port on the server corresponding to the LAN interface
        Mark the Ethernet Port as virtual because it represents the vNIC
    }
}
```

Module 350 also creates data structures to establish customized topology links between the switch and the server using available LLDP information. For a data center environment, system management applications have to create links between servers and switches based on information obtained using protocols like LLDP, the FDB, etc. This information is directly represented using Ethernet links between the LAN interfaces of the systems.

Module 350 may use different methods to obtain the topology information in vNIC cases and extrapolate for the vNIC connections. For example, in one embodiment, using vNIC-specific SNMP MIBs, the server port MAC addresses for the individual vNICs in the switch SNMP data for vNIC MIBs is used. In this method, the links of the vNICs on the switch and the server side are directly shown. But, this is possible only in the case of Virtual Fabric Mode (vNIC Mode 1). For other modes, the server vNIC MAC addresses in the SNMB MIBs are not obtained. Thus, using LLDP data from SNMP MIBs (e.g., querying the SNMP table for LLDP data), the MAC address of one of the vNICs associated with the physical switch port are obtained. So, once that link is established (e.g., the physical switch port and one of the vNIC ports of server), the module 350 traverses to the physical NIC of the server to obtain the server vNIC and, based on the virtual indexes, the vNIC connectivity is established.

As discussed above, for the vNIC modes of the system, the information cannot be directly transformed into a link directly because it is partially incorrect information. However the management applications generally depict a consistent view across all the systems be it virtual or physical. Thus, module 350 module creates a generic infrastructure to fetch this information from the server and the switches and creates uniform consistent relationships customized for vNIC. The following exemplary pseudocode describes a process for creating data structures to establish customized topology links between the switch and the server:

```
For every Ethernet link found from remote device information of LLDP/
FDB data {
    Check if this link is using VNIC technology
    If (vNIC mode is operational) {
        Do not create the relationship for the Ethernet link found from
        LLDP table
```

```
Let vNIC-specific topology module create the relationships
}
Mark all the links created by vNIC-specific topology module as
    vNIC_Type
}
```

Figure 6:
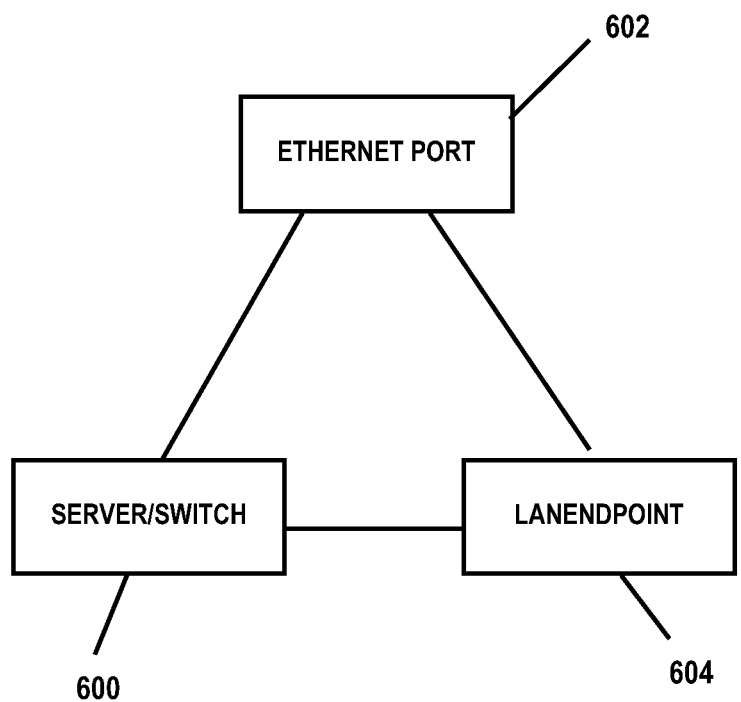
FIG. 6 is a diagram illustrating a representation of one set of a server/switch system, its LAN interface and port interface connected to each other as a trio according to the present disclosure.

Module 350 then creates new topology links by correlating the information on the switch with the server. As indicated above, all the network interfaces wherever required have already been established. Actual correlations between these interfaces are now established. For example, in the above-described processes, the LAN and port interfaces for the server, hypervisor and switches have been created. These systems already have vNIC information distributed but not related to each other. Module 350 traverses some relations and creates the topology links. Module 350 create these mappings by treating one set of the server/switch system, its LAN interface and port interface connected to each other as a trio. FIG. 6 depicts an exemplary representation of this trio having a server/switch system 600, Ethernet port 602 and LANEndpoint 604 connected to each other as a trio. Module 350 extrapolates the LLDP link found for the physical port. The link is discovered between the physical port of the switch and one of the virtual Ethernet ports of the server. This in itself is an incorrect relationship. Additionally links for the remaining virtual Ethernet ports on the server are missing. Module 350 relies on the index of the port obtained from SNMP inventory data of the switch and the adapter drivers on the server. The following exemplary pseudocode describes a process for extrapolating the LLDP link found for the physical port:

```
For the server LANEndpoint and switch LANEndpoint in LLDP Ethernet
link {
    Get the virtual port of the switch LANEndpoint
    Get the parent physical port for the given virtual port
    Get all the vNIC virtual ports trio (i.e., switchVirtualTrioList) of this
    physical port
    Get the Ethernet port of the server LANEndpoint
    Get the parent Ethernet port for the given virtual Ethernet port
    Get all the vNIC Ethernet ports trio (i.e., serverVirtualTrioList) of this
    parent port
    For every virtual port trio which is a vNIC-based port {
        Get the server trio using same index of the Ethernet port
        Create relationships between the switch Trio and server Trio
        Add the relation to the list
    }
    Return the list as list of all the Ethernet links to be created for this
    LLDP link
}
```

Thus, embodiments of the present disclosure generates relationships between physical ports on a switch and virtual ports using vNIC technology based on system configurations. These relationships are then traversed to generate data structures (e.g., maps) that represent vNIC information on the server. Using these data structures, module 350 displays a view of the systems communicating at the vNIC level with each other.

Figure 7:
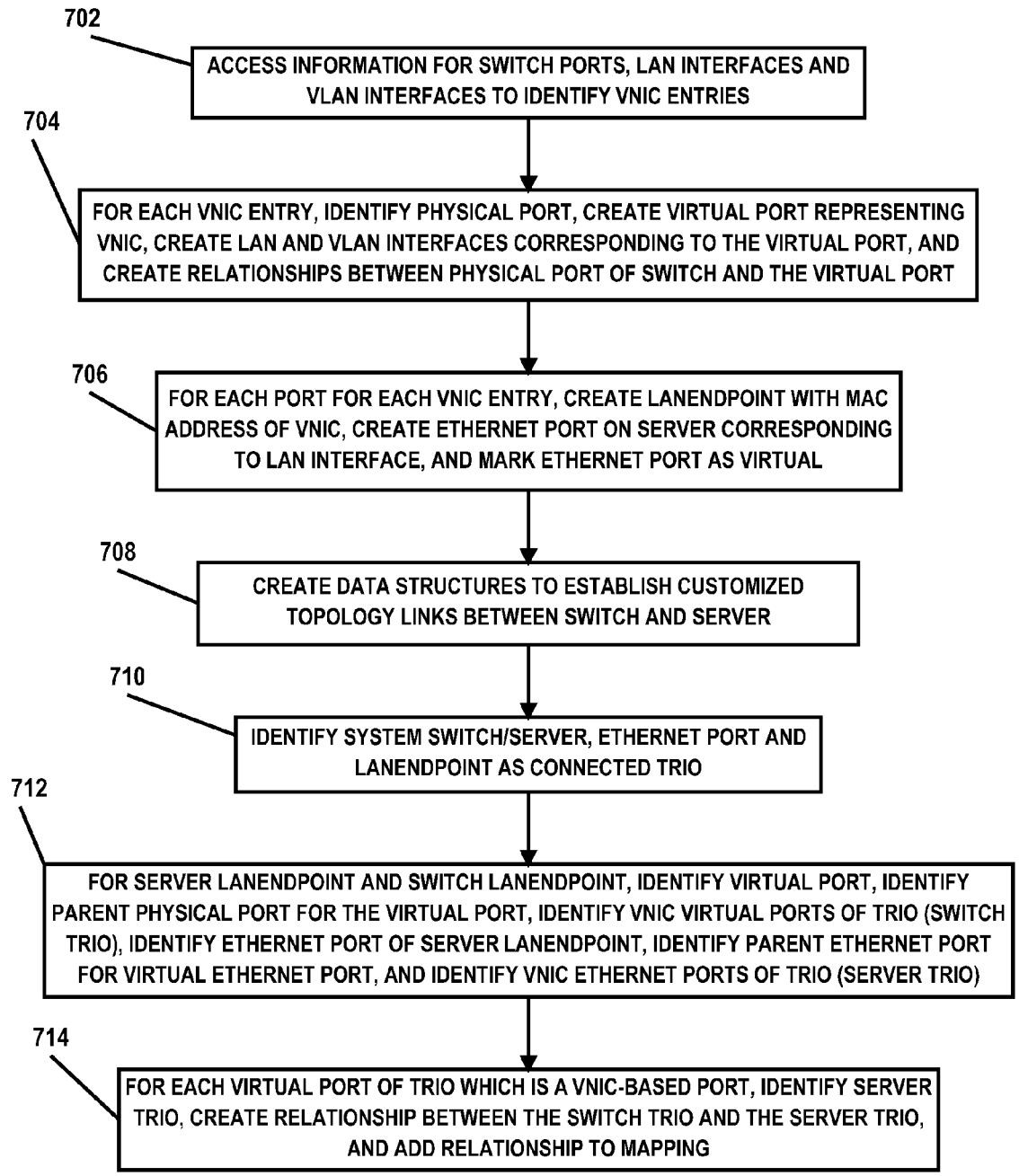
FIG. 7 is a flow diagram illustrating an embodiment of a method for mapping relationships among virtual elements across a system according to the present disclosure.

FIG. 7 is a flow diagram illustrating an embodiment of a method for mapping relationships among virtual elements across a system. The method begins at block 702, where module 350 accesses information for switch ports, LAN interfaces and VLAN interfaces to identify vNIC entries (e.g., from SNMP MIBs in management applications 352). At block 704, for each vNIC entry, module 350 identifies a physical port, creates a virtual port representing the vNIC, creates LAN and VLAN interfaces corresponding to the virtual port, and creates relationships between the physical port of the switch and the virtual port. At block 706, for each port for each vNIC entry, module 350 creates a LANEndpoint with the MAC address of the vNIC, creates an Ethernet port on the server corresponding to the LAN interface, and marks the Ethernet port as virtual.

At block 708, module 350 creates data structures to establish customized topology links between the switch and the server. At block 710, module 350 identifies a system switch/server, Ethernet port and LANEndpoint as a connected trio. At block 712, for the server LANEndpoint and switch LANEndpoint, module 350 identifies a virtual port, identifies the parent physical port for the virtual port, identifies vNIC virtual ports of the trio (switch trio), identifies an Ethernet port of the server LANEndpoint, identifies the parent Ethernet port for the virtual Ethernet port, and identifies the vNIC Ethernet ports of the trio (server trio). At block 714, for each virtual port of trio which is a vNIC-based port, module 350 identifies a server trio, creates relationship between the switch trio and the server trio, and adds the relationship to the topology link mapping.

Thus, embodiments of the present disclosure generates relationships between physical ports on a switch and virtual ports using vNIC technology based on system configurations to derive mappings of the topology links between virtual ports on a switch and corresponding vNIC links on a virtualized adapter interface. A virtual relationship module utilizes LLDP or other information to create relationships between physical and virtual ports on a switch, identifies LAN interface on a server/hypervisor for vNIC links of the adapter on the server, creates data structures to establish links between the switch and the server, and then creates new topology links by correlating the information on the switch with the server.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system, comprising:
    a switch having a plurality of virtual switchports;
    a server having a network interface controller (NIC) with a physical port, the server further including a virtual fabric adapter configured to virtualize the NIC to form a plurality of virtual NIC ports; and
    a virtual relationship module executable by a processor to automatically determine a network topology indicating virtual links (vNICs) between the virtual NIC ports and the respective virtual switchports, the virtual relationship module configured to:
        establish relationships between a physical switchport on the switch and the virtual switchports on the switch using Simple Network Management Protocol (SNMP) management information base (MIB) information;
        establish local area network (LAN) interface information on the server for each vNIC link by:
            creating a LAN endpoint with a media access control (MAC) address of a respective virtual NIC port;
            creating an Ethernet port on the server corresponding to the LAN endpoint; and
            identifying the Ethernet port as virtual;
        query the SNMP MIB information for Link Layer Discovery Protocol (LLDP) data to obtain the MAC address of one of the virtual NIC ports associated with the physical switchport and omit creation of vNIC link therebetween based on the LLDP data; and
        based on the LLDP data and an index of the SNMP MIB information of the switch, generate the network topology indicating the vNIC links between the respective virtual NIC ports and the virtual switchports.

2. The system of claim 1, wherein the virtual relationship module is configured to, for each vNIC link:
    identify the physical switchport on the switch associated with the vNIC link; and
    for the identified physical switchport:
        create the virtual switchport;
        create a LAN endpoint corresponding to the virtual switchport; and
        create a relationship between the physical switchport and the virtual switchport.

3. The system of claim 2, wherein the virtual relationship module is configured to, based on the LAN endpoint of the server and the LAN endpoint of the switch indicated by the LLDP data:
    identify the virtual switchport of the switch corresponding to the LAN endpoint of the switch;
    identify the physical switchport of the switch for the virtual switchport on the switch;
    identify each vNIC link trio on the switch corresponding to the physical switchport of the switch, each vNIC link trio including an indication of a particular virtual switchport, physical switchport, and LAN endpoint;
    identify the virtual Ethernet port associated with the LAN endpoint on the server;
    identify the physical port on the server corresponding to the virtual Ethernet port;
    identify each vNIC link trio on the server corresponding to the physical port, each vNIC link trio on the server including an indication of a particular virtual Ethernet port, LAN endpoint, and physical port of the server;
    identify the server vNIC link trio using a same index as the physical switchport; and
    generate the vNIC link between the identified server vNIC link trio and the corresponding switch vNIC link trio.

4. A computer program product for mapping relationships among virtual elements across a system, the computer program product comprising a computer readable storage medium having program instructions embodied therewith, the program instructions executable by a processor to cause the processor to perform a method comprising:
    for a server having a network interface controller (NIC) with a physical port, the server further including a virtual fabric adapter configured to virtualize the NIC to form a plurality of virtual NIC ports, and a switch having a plurality of virtual switchports, determining a network topology indicating virtual links (vNICs) between the virtual NIC ports and the respective virtual switchports by:
        establishing relationships between a physical switchport on the switch and the virtual switchports on the switch using Simple Network Management Protocol (SNMP) management information base (MIB) information;
        establishing local area network (LAN) interface information on the server for each vNIC link by:
            creating a LAN endpoint with a media access control (MAC) address of a respective virtual NIC port;
            creating an Ethernet port on the server corresponding to the LAN endpoint; and
            identifying the Ethernet port as virtual;
        querying the SNMP MIB information for Link Layer Discovery Protocol (LLDP) data to obtain the MAC address of one of the virtual NIC ports associated with the physical switchport and omit creation of a vNIC link therebetween based on the LLDP data; and
        based on the LLDP data and an index of the SNMP MIB information of the switch, generating the network topology indicating the vNIC links between the respective virtual NIC ports and the virtual switchports.

5. The computer program product of claim 4, wherein the program instructions are executable by the processor to cause the processor to, for each vNIC link:
    identify the physical switchport on the switch associated with the vNIC link; and
    for the identified physical switchport:
        create the virtual switchport;
        create a LAN endpoint corresponding to the virtual switchport; and
        create a relationship between the physical switchport and the virtual switchport.

6. The computer program product of claim 5, wherein the program instructions are executable by the processor to cause the processor to, based on the LAN endpoint of the server and the LAN endpoint of the switch indicated by the LLDP data:
  identify the virtual switchport of the switch corresponding to the LAN endpoint of the switch;
  identify the physical switchport of the switch for the virtual switchport on the switch;
  identify each vNIC link trio on the switch corresponding to the physical switchport of the switch, each vNIC link trio including an indication of a particular virtual switchport, physical switchport, and LAN endpoint;
  identify the virtual Ethernet port associated with the LAN endpoint on the server;
  identify the physical port on the server corresponding to the virtual Ethernet port;
  identify each vNIC link trio on the server corresponding to the physical port, each vNIC link trio on the server including an indication of a particular virtual Ethernet port, LAN endpoint, and physical port of the server;
  identify the server vNIC link trio using a same index as the physical switchport; and
  generate the vNIC link between the identified server vNIC link trio and the corresponding switch vNIC link trio.

* * * * *